United States Patent [19]

Kenney

[11] Patent Number: 4,653,790

[45] Date of Patent: Mar. 31, 1987

[54] COIN GETTING APPARATUS

[76] Inventor: Dean Kenney, 737 S. Buildings Blvd. #0, Billings, Mont. 59101

[21] Appl. No.: 829,014

[22] Filed: Feb. 13, 1986

[51] Int. Cl.$^4$ ............................................. A01B 1/20
[52] U.S. Cl. ........................................ 294/50; 7/114; 7/158; 294/50.7; 294/51; 294/59
[58] Field of Search ................................ 294/2, 50–51, 294/61, 59; 7/113, 114, 158, 167, 170; 30/123, 124, 134, 135, 162; 172/21, 22

[56] References Cited

U.S. PATENT DOCUMENTS

| 43,085 | 6/1864 | Boone | 294/50.7 |
|---|---|---|---|
| 588,833 | 8/1897 | Overbey | 294/50.7 X |
| 1,469,160 | 9/1923 | Kessel | 294/51 X |
| 1,548,865 | 8/1925 | Bull | 294/59 X |
| 1,939,897 | 12/1933 | Hill | 294/50.7 X |
| 2,284,168 | 5/1942 | Rickenbacher | 30/162 X |
| 2,622,729 | 12/1952 | Uttz | 30/123 X |
| 3,210,112 | 10/1965 | Glynn | 294/50.7 |
| 3,364,572 | 1/1968 | Hoppe | 30/124 |
| 3,798,688 | 3/1974 | Wasson | 7/158 |

FOREIGN PATENT DOCUMENTS 510933 1/1955 Italy ...................................... 172/22
27185 of 1907 United Kingdom ............... 294/50.5

OTHER PUBLICATIONS

"Treasure" Magazine (Advertisement) vol. 6, Jun., 1982, p. 57, The Treasure Mole.
"Western and Eastern Treasures" Magazine, vol. 19, No. 4, Apr., 1985, p. 19 (Advertisement) Bull Plug.

Primary Examiner—Johnny D. Cherry
Attorney, Agent, or Firm—Schroeder & Siegfried

[57] ABSTRACT

A treasure digging tool is disclosed with an open elongated circular tube formed at one end thereof to which is secured a spring-biased mechanism that works in conjunction with the circular tube when digging for treasure. The depth to which the treasure digging tool may descend into the earth is controlled by a pair of depth slides. Initially, a knife that is releasably secured to the end of the depth slides is used to gain entrance below lawns by making a singular widened straight angle cut through the lawn surface. Additionally, a piston rides within the confines of the circular tube to help remove and repack the earth previously removed.

7 Claims, 5 Drawing Figures

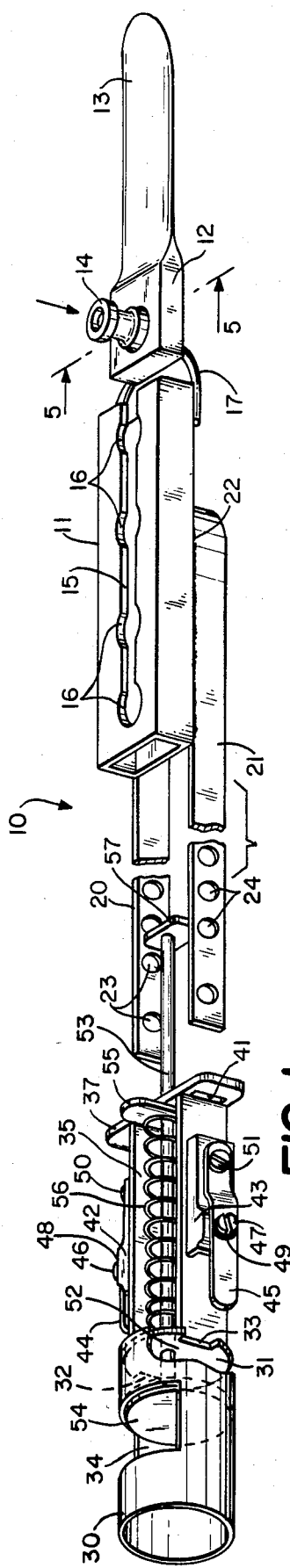
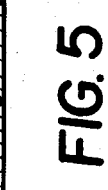
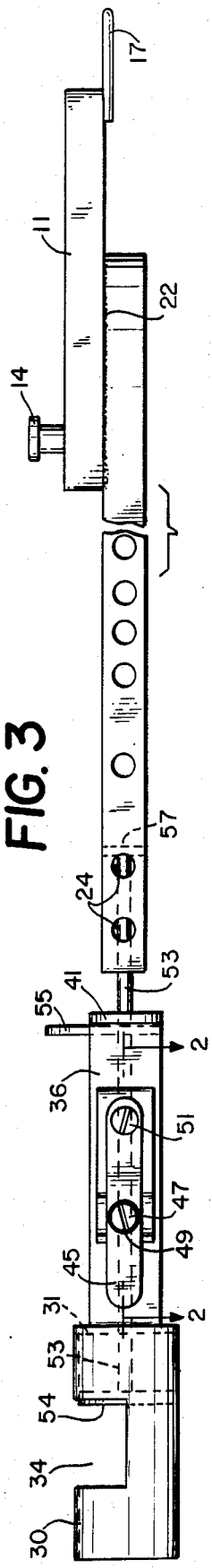
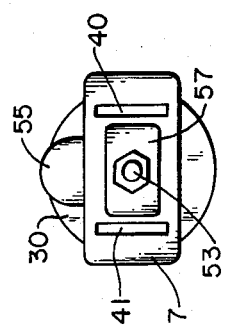
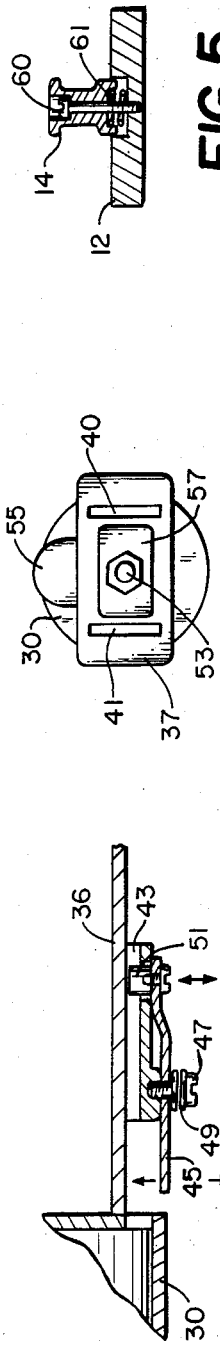

COIN GETTING APPARATUS

DESCRIPTION

This invention relates in general to apparatus used by treasure seekers and more particularly by those who dig for coins and buried treasure found in the outer layers of the earth.

The present invention adjusts to the depth of the plug of soil that is to be removed and provides an inspection window through which the plug may be inspected for treasure. Through the use of the knife, the depth of the hole may be deepened until a proper plug of soil is removed. The depth at which the tool may be used and accordingly the depth of the soil plug to be removed, may be extended into the soil through the use of a pair of depth slides that are adjustable for depth.

Metal detecting has become a very precise science of electronics, in gaining knowledge of what and where metal targets are buried in the ground. The coin getter, using a detector, receives a definite point reference as to the location of a coin buried in the ground. This point reference is called pinpoint by detector operators and after the operator determines this spot on the surface of the ground we use a probe to poke into the ground until we touch the coin. After touching the coin the probe can be removed, but leaves a small centering hole to where the coin is buried.

The Coin Getting Apparatus is named for what it does best, which is to retrieve coins from the ground by core digging, which is a very fast method of recovery. This tool includes a multiple of tools put together for compactness so it is easier to carry, has small digging area and the extra tools enhance this method of digging coins by their specially designed uses. The tool is collapsible and extendable to dig deeper than we can detect, but still carries small. The principle of digging with the Coin Getting Apparatus is the same as core drilling, except on a smaller, more confined scale, to extract cores of dirt, and the treasure items enclosed in cores of dirt that have been detected in the outer earths surface.

Prior art exists, as found under the name "The Treasure Mole" as shown in the Magazine "Teasure" 1982, Volume No. 6 and is directed to a form of mechanical mole that can cut a plug of earth from the soil wherein a plunger action is initiated to force the plug of soil from the prior art mechanism. This device has no means of providing a mechanism for removing any treasure from the plug of soil nor inspecting the plug of soil through a window exposing the plug.

These and other features of the invention are fully set forth in the accompanying disclosure.

It is therefore a general object of this invention to provide an improvement in treasure digging equipment.

It is still another object of this invention to provide a treasure digging tool that makes use of a pair of depth slides to extend the depth to which the hole may be dug.

It is another object of this invention to provide a tubular member having a window formed in the same through which treasure may be secured.

It is still a further object of this invention to provide a biased mechanism having a piston that may be adjusted to the depth to be dug by the tool.

It is still another object of this invention to have a knife on the opposite end of the digging equipment to aid in finding the treasure.

These and other objects and advantages of the invention will more fully appear from the following description, made in connection with the accompanying drawings, wherein like reference characters refer to the same or similar parts throughout the several views, and in which:

BRIEF DESCRIPTION OF THE DRAWINGS

FIG. 1 is a perspective of an embodiment of the invention disclosed in an exploded view;

FIG. 2 is a sectional view of the releasable connector that cooperates with the depth slides of the treasure digging tool;

FIG. 3 is a side elevational view of my treasure digging tool;

FIG. 4 is an end view of a transverse member forming part of a spring-biased mechanism; and FIG. 5 is a section taken through the knife at the end of the treasure digging tool.

DETAILED DESCRIPTION OF THE INVENTION

Turning now to FIG. 1, there is found the coin digging tool 10 that has a knife sheath 11 formed at the end thereof with a knife 12 secured within the same.

Knife 12 was designed and attached to the tool for use in cutting through lawn turf, by making a singular straight angle cut, that is widened at the precise point above the coin. The widening of this slice is lawn turf is accomplished by under cutting of each side of the straight cut and by exerting an outward, lifting, prying action, forcing the slice to be widened larger than the barrel, so the plug digging can be executed to retrieve treasure.

Knife 12 has a sharpened end 13 and a spring-loaded stud 14 secured thereto. Sheath 11 has a groove 15 formed down its top side into which a plurality of bores 16 are formed at equally spaced distances along slot 15. Upon depression of the spring loaded stud 14, that is formed like a spool, one rim of the same is depressed into the knife so that the stem of stud 14 may slide in slot 15 and upon being released, the lower spool rim engages the edge of one of the bores 16.

As seen in FIG. 5, releasable lock 14 is fabricated with a screw 60 which is seated in knife 12 by a suitable means such as threads and a compression spring 61 is formed about screw 60 so that it will be compressed when releasable lock 14 is depressed allowing the knife to slide within sheath 11.

A loop 17 is welded to the edge of sheath 11 and may be used to secure the arrangement to a holder as well as keeping the sheath clean from any earth deposits that may be pulled back into the sheath with knife 12.

A pair of depth slides 20 and 21 are formed in a U-shape and the closed end of the U-shaped piece is welded at 22 to the sheath 11. In other words, sheath 11 lies on the top of the depth slides 20 and 21 and is secured on depth slide 21 so that the two legs of the depth slides work like a large pair of tongs. A plurality of bores 23 are formed in depth slide 20 and a plurality of bores 24 are formed opposite bores 23 in depth slide 21.

A tubular or coring barrel 30 has a closed end 31 that has a pair of openings on each side thereof that will permit depth slides 20 and 21 to extend through a pair of openings 32 (shown as hidden lines in FIG. 1) and 33. Disposed in the central portion of tubular member 30 is a window 34 which will expose any slugs of soil that are being removed by the coin digging tool 10. A pair of bars 35 and 36 are secured to plate 31 and extend parallel to depth slides 20 and 21. Welded across the ends of bars 35 and 36 is a plate 37 that has a pair of slots 40 and 41 formed therein that will accommodate depth slides 20 and 21 and permit them to move along the sides of bars 35 and 36.

The plugging, or coring barrel however does use a twisting downward motion into the ground, to fill the barrel with dirt and then the tool is pulled from the ground with the dirt core or plug in it's coring barrel. That plug is expelled by exerting pressure on the plunger lug tab, top plunger plate, or both. The repeating of this action digs a hole to the coin which can then be retrieved. After the coin is recovered all the plugs are tamped into the hole and the slice is tamped closed.

A pair of elongated sleeves 42 and 43 are disposed at the sides of rails 35 and 36 and allow depth slides 20 and 21 to slide through the same. That is, sleeves 42 and 43 are welded to the edge of bars 35 and 36. A pair of spring-loaded levers 44 and 45 are disposed outside sleeves 42 and 43 respectively where they are held in place by a pair of machine screws 46 and 47. Machines screws 46 and 47 are threaded into bars 35 and 36 and have a pair of circular tension springs 48 (shown as hidden on the back side of FIG. 1) and 49 secured beneath the heads of the machine screws and bear against levers 44 and 45.

A pair of studs 50 and 51 are secured to levers 44 and 45 by suitable means such as welding where the ends of the studs extend through a bore in sleeves 43 and 44 and upon pressing the ends of levers 44 and 45, will slide into one of bores 23 and 24 to hold the depth slide locked in place. By pressing the opposite end of levers 44 and 45, studs 50 and 51 disengage bores 23 and 24 and the depth slides may then be adjusted for a proper depth.

A hole or bore 52 is formed in the center of disk 31 that seals off tubular member 30. Passing through bore 52 is a rod 53 that is secured to a piston or disk 54. The upper most position of piston 54 is controlled through the use of a lug 55 that is secured to rod 53. Lug 55 extends radially and is secured against axial movement by being secured inside plate 37 so that lug 55 cannot extend axially. A compression spring 56 is secured around rod 53 between disk 31 and lug 55. Rod 53 extends beyond plate 37 and has another plate 57 secured at the end thereof which stops the travel of piston 54 as it moves through the end of tubular member 30.

Briefly this tool is designed to be used to dig coins that have been detected with a metal detector. Anyone using a Coin Getting Apparatus needs to know about pinpointing with detectors. Also, that a probe is any 8 or 9 inch long, 3/16 inch diameter metal shank with a handle that is poked into the ground to touch a coin. Long shanked screw drivers with the blade ground more blunt make a good probe.

I will describe, step by step, digging for a coin through a good lawn turf to a depth of six inches. First, grasp the Coin Getting Apparatus and extend the knife fully to the last locking hole. Be sure it is locked. The probe mentioned earlier is now standing perpendicular in the ground directly on top of the coin. The knife is now used, starting four inches from the probe, cutting through the lawn to a depth of about three inches. A cut is then made in a straight line to the probe and past it, for four inches. There is now a straight line cut eight inches long. Remove the probe, and working at the center where the probe was, under-cut on an angle under the lawn turf of both sides of the eight inch cut. Lift and pry an oval opening through the lawn bigger than the coring end of the Coin Getting Apparatus.

Starting with the widened oval opening through the lawn, we are now in dirt below the lawn. We then probe to again re-check and find the original probe hole. This tells us where to center for coring and whether we may need more widening of the opening.

Now the knife is closed back into it's sheath and locked. The coring barrel is checked for adjustment of length of core it will dig. It is suggested that the tool be always reset to it's normal digging mode after any special digging is completed. The normal digging mode setting of this tool is when plunger disk 54 is set about even when the bottom of treasure window 34. The coring barrel 30 in this setting will remove one inch long cores or plugs of earth. Center the coring barrel 30 over the probe hole and add a downward twisting pressure to fill coring barrel 30; then lift the tool from the ground and push on the top plunger plate, plunger lug tab, or both, to expell a core of dirt from the tool. Then make two more coring passes into the hole, removing and stacking the cores. The hole should now be five inches deep and one more inch of dirt covers the coin. This last inch has to be removed carefully or the coin could be hit and destroyed.

It is best now to change the setting of the tool so it will remove one half inch cores of dirt. To change the tool, grasp and release the adjusting levers on the sides of the tool and push inward on the depth slides one hole of adjustment, making sure the depth slides lock. Another one half inch core can now be removed, but still a half inch of dirt covers the coin. With a prying action the probe is used to insure centering and lifting of the coin through the dirt so that it may be seen. Now we have two ways to get the coin. One is to reset the tool for normal coring, take out one more core, open the tool to expose the treasure window, and with finger or probe release the coin from the top of the dirt core, and dump the coin from the window into your hand. The other way to remove the coin, is to grasp the adjusting levers, push on both of them and pull the depth slides free of the coring barrel. With the depth slides, enter the hole and carefully position the ends of the slides, which have now become tweezers, on two sides of the coin at the bottom of the hole, squeeze the tweezers and lift the coin, placing it in your hand.

It will, of course, be understood that various changes may be made in the form, details, arrangement and proportions of the parts without departing from the scope of the invention which consists of the matter shown and described herein and set forth in the appended claims.

What is claimed is:

1. A treasure digging tool having in combination:
    (a) a hole cutting mechanism having a longitudinally extensible knife;
    (b) a pair of spaced apart depth slides extending longitudinally in parallel arrangement from said hole cutting mechanism, said pair of depth slides fixedly secured to said hole cutting mechanism and having a plurality of transverse bores formed in each of said depth slides;
    (c) an open elongated circular tube having a diameter greater than the spacing between said pair of depth slides, and having a first open end and a second closed end with openings to admit said pair of depth slides;

(d) a piston disposed within said open elongated tube and adapted to move longitudinally in the same; and (e) a spring biased mechanism secured across said second end of said elongated circular tube, said biased mechanism having a transverse member also admitting said depth slides, and a central rod connected to and extending between said piston and through said transverse member, said biased mechanism pressing said piston towards said second end of said tube, said elongated tube constructed and arranged to be inserted in the soil to withdraw a sample of the same with any treasure contained in the sample.

2. The invention as set forth in claim 1 including:

(f) a pair of parallel rails secured within said biased mechanism having releasable connectors secured to the sides thereof for engaging and securing said plurality of transverse bores formed in said depth slides to adjust the length of the same and the depth to which said piston may move within said circular tube.

3. The invention as set forth in claim 2 wherein said releasable connectors include:

(k) a pair of sleeves having transverse bores formed therein secured to the sides of said parallel rails to slidably secure said pair of depth slides; and (l) a pair of spring biased studs extending through said bores formed in said sleeves and depth slides to lock the same in place.

4. The invention as set forth in claim 1 including:

(g) an elongated sheath encompassing said knife having first and second ends, the first end being weldably secured to said pair of depth slides, said sheath having a plurality of engagable connectors disposed to accommodate extension of said knife; and (h) a releasable lock secured to said knife and cooperating with said plurality of engagable connectors to establish extension of said knife.

5. The invention as set forth in claim 4 including:

(i) a curved metal loop welded to said sheath at its second end.

6. The invention as set forth in claim 1 including:

(j) a window formed in the wall of said elongated circular tube exposing the interior thereof upon said piston being moved to expose said window.

7. The invention as set forth in claim 1 including:

(m) a lug fixedly secured to said central rod between said transverse member and said second closed end of said circular tube to apply pressure against said spring biased mechanism when the soil sample is to be examined.

* * * * *

UNITED STATES PATENT AND TRADEMARK OFFICE
CERTIFICATE OF CORRECTION

PATENT NO. : 4,653,790

DATED : March 31, 1987

INVENTOR(S) : Dean Kenney

It is certified that error appears in the above-identified patent and that said Letters Patent is hereby corrected as shown below:

Column 4, line 14, the word "when" should be "with".

Signed and Sealed this

Fifth Day of January, 1988

*Attest:*

DONALD J. QUIGG

*Attesting Officer*  *Commissioner of Patents and Trademarks*